Patented Dec. 6, 1938

2,139,498

UNITED STATES PATENT OFFICE 2,139,498

PROCESS OF SEPARATING PRECIOUS METALS FROM NONPRECIOUS METALS IN METAL BEARING EARTH

Ernest Hey, Seattle, Wash., and Franklin H. Hunsicker, Oakland, Calif., assignors of forty-five percent to said Hey, ten percent to said Hunsicker, and forty-five percent to Robert Dixon, Oakland, Calif.

No Drawing. Application June 17, 1937, Serial No. 148,728

8 Claims. (Cl. 75—83)

This invention relates to the separation of precious metals from non-precious metals in sands, gravels and ores, hereinafter designated "metal bearing earth". One object of this invention is an improved process for facilitating the recovery of various metals present in metal bearing earth in a more efficient, simple and economical manner than heretofore and which process enables commercially profitable recovery of metals from metal bearing earth that heretofore has been unworked by reason of the impossibility of obtaining a satisfactory separation of the metals present therein in a form whereby their recovery is commercially practical. Other objects and advantages will be disclosed in the following description.

Briefly described, our invention comprises making an impure or "dirty" metallic glass compound from the metal bearing earth in which making an agent is employed, which agent is of a character to insure silication of substantially all the non-precious metals while insuring at the same time the reduction of the precious metals in said metal bearing earth to their elements respectively, such as gold, silver and/or platinum. After the glass is produced, and reduced to sufficient fineness, the gold, silver or platinum, or all three elements, being reduced to their elements, are readily recovered by ordinary amalgamation or concentration process, and the residue, when resmelted with the addition of carbon readily responds to the conventional processes for recovery of the iron, copper, lead, zinc, chomium, manganese, etc., therefrom.

In detail, where the metal bearing earth that contains precious and non-precious metals is of a character having sufficient silica or silicon sand to produce a metallic glass compound when melted, we first moisten the dry mass with sodium hypochlorite solution. This earth thus moistened is then placed in a crucible and heated to about 1500° F. or upwards to as high as about 3500° F. according to the source of heat, until there is complete liquification of the mass and thorough silication of substantially all the non-precious metals, the molten mass being subjected to the oxidizing effect of air while under heat to substantially eliminate sulphur. It is of course obvious that the time required for complete liquification of the mass will vary according to the nature of the metal bearing earth, the volume thereof and the character of the source of heat, however, when the molten mass has completely subsided to a smooth and unalterable surface, and then cooled, the precious metals will be found to be substantially reduced in the mass to their respective elements and the remainder including substantially all the non-precious metals will be fully silicated. The addition of the air, while the mass is heated in addition to the oxidizing effect, has a tendency to help the mass liquify.

While the glass, after thus being made, may be ground to suitable fineness for recovery of the precious metals by the amalgamation or other process, for the recovery of free metals, say from about 80 to 100 mesh, we preferably draw off the molten glass directly into water or a neutral, saline or alkaline solution, which will cause the glass to shatter into relatively small pieces, thereby facilitating the grinding of the glass to the desired size. A saline or alkaline solution is preferably used since grinding of the pieces shattered in such solution, in a ball mill, wherein amalgamation may take place facilitates the amalgamation, although any conventional method of grinding may be practiced.

In instances where the metal bearing earth is deficient in the necessary characteristics to produce glass, when melted, we add sufficient silica, or silicon sand, and mineral calcium carbonate, sodium carbonate or lime or a combination of the three latter compounds, as desired, to insure the silication of the mixture, the dry metal bearing earth being first moistened with sodium hypochlorite.

The sodium hypochlorite used may contain up to about 22% available chlorine, by weight, but we prefer to use a solution containing about 18%. It is obvious, of course, that the metal bearing earth may first be moistened with an alkaline solution and then subjected to chlorine gas to produce the sodium hypochlorite, but due to the dangerous character of the chlorine gas, it is preferable to use ready prepared sodium hypochlorite.

A suitable mixture for melting, as described, where the metal bearing earth is black sand, and no silicon sand, is as follows:

50 lbs. black sand moistened throughout the mass with sodium hypochlorite containing about 18% available chlorine, by weight.
5 oz. sodium carbonate.
20 lbs. silicon sand.
4 oz. mineral calcium carbonate.

While sodium hypochlorite, as the agent for insuring reduction of the precious metals and silication of the impurities, such as iron, copper, lead, zinc etc. is preferable, we may instead use an alkaline compound containing chlorine, such as bleaching powder, calcium chloro-hypochlorite, potassium chlorate, potassium hypochlorite, or sodium chlorate, the salt or salts used being mixed with the metal bearing earth prior to melting. A satisfactory proportion of the compound used relative to the earth is one sufficient to furnish approximately the same amount of available chlorine that is present in the sodium hypochlorite solution, where such solution is used as heretofore described. Obviously the quantity of the compound will vary according to which compound is used, but the necessary amount can readily be determined by any one skilled in the art from the above explanation.

Under ordinary circumstances, precious metal bearing earth generally contains an appreciable amount of iron, black sand containing as high as 50% and rarely does the metal bearing ore contain less than 20% iron in some form, such as a sulphide or oxide. However, should there be substantially less than 20% iron in the metal bearing ore, we preferably add ore in sufficient quantity that contains iron to furnish with the metal bearing earth a mixture containing approximately from 15% to 20% iron. We have found that the presence of iron greatly facilitates and insures the silication of the non-precious metals when the mass is melted, from present indications.

As already explained, the use of sodium hypochlorite, or alkaline compound containing chlorine, accomplishes the reduction of the gold, silver and/or platinum, and the iron, copper, lead, zinc, and other impurities are absorbed in the metallic glass compound, whereby the precious metals are in the glass as free metals and easily and readily recoverable.

After recovery of the precious metals, by concentration or amalgamation, the glass residue may be smelted with carbon and the non-precious metals are then readily recoverable by the conventional methods. By reason of silication of the metal bearing earth, as described, the recovery of chromium where found in ore containing titanium, is commercially practical and the same is true of manganese where the manganese is found in ore containing phosphorus and copper.

In the claims, the use of the term "oxidizing agent containing chlorine" is intended to cover either alkaline solutions, such for example, as sodium hypochlorite, or alkaline compounds such, for example, as bleaching powder, calcium chlorohypochlorite, potassium chlorate, potassium hypochlorite, and sodium chlorate.

The term "oxidizing agent" in the claims is intended to refer to the above designated oxidizing reagents containing chlorine respectively and to also refer to any oxidizing compound containing a halogen, since such compounds may be used in my process in substantially the same manner and for accomplishing substantially the same end as say, sodium hypochlorite, or the salts specifically mentioned above in which chlorine is present. Also the use of the term "metal bearing earth" is intended to include any precious metal bearing sands, gravels and ores that may likewise contain non-precious metals such as iron, copper, lead, zinc, etc., and the use of the term "siliceous material" is intended to designate any silicas or silicon sand with sufficient mineral calcium carbonate, sodium carbonate, or lime in whatever combination to provide together with the impurities in the metal bearing earth, a mixture that will produce a metallic glass compound, when melted, which impurities include the non-precious metals such as iron, copper, lead, zinc in whatever form they are present in the metal bearing earth.

Having described our invention, we claim:

1. The method of treating metal bearing earth that contains not less than about 15% iron, by weight, for separating the precious metals therein from the impurities comprising the step of adding an oxidizing agent containing chlorine to said earth, then melting the mixture together with siliceous material for causing substantial silication of the impurities and substantial reduction of the precious metals to their elements.

2. The method of treating metal bearing earth that contains not less than about 15% iron, by weight, for separating the precious metals therein from the impurities comprising the step of making an impure, dirty metallic glass compound from metal bearing earth, siliceous material and a relatively small amount of oxidizing agent containing chlorine, and thereafter grinding the glass to substantial fineness for releasing the precious metals in the ground glass for recovery thereof.

3. The method of treating metal bearing earth that contains not less than about 15% iron, by weight, for separating the precious metals therein from the impurities comprising the step of adding an oxidizing agent containing chlorine to the earth and then silicating the impurities in the earth with siliceous material by application of heat at melting temperature and subjecting the molten mass to the oxidizing effect of air.

4. The method of treating metal bearing earth that contains not less than about 15% iron, by weight, for separating the precious metals therein from the impurities comprising the step of making an impure, dirty, metallic glass compound from metal bearing earth, an oxidizing agent containing chlorine, and siliceous material by application of heat to the mixture at a melting temperature until the mixture is completely melted, then drawing off the molten mass into an aqueous solution for shattering the molten mass into relatively small pieces and thereafter grinding the small pieces to powder.

5. The method of treating metal bearing earth that contains not less than about 15% iron, by weight, for separating the precious metals therein from the impurities comprising melting the earth with siliceous material and sodium hypochlorite to produce an impure, molten, dirty metallic glass compound, cooling the molten mass and thereafter grinding the glass to substantial fineness and removing the precious metals from the ground glass by concentration or amalgamation.

6. The method of treating metal bearing earth that contains not less than about 15% iron, by weight, for separating the precious metals therein from the impurities comprising producing a dirty, metallic glass compound by melting the earth together with siliceous material and an oxidizing agent containing chlorine, said reagent comprising a member of one of the group consisting of sodium hypochlorite, bleaching powder, calcium chloro-hypochlorite, potassium chlorate, potassium hypochlorite, chlorine, and sodium chlorate, and thereafter cooling the molten glass and grinding the glass to substantially powder fineness.

7. The method of treating metal bearing earth that contains not less than about 15% iron, by weight, for separation of the metals contained therein for recovery of the precious and non-precious metals therefrom comprising the steps of melting the earth together with an oxidizing agent containing a halogen and with sufficient siliceous material to form a molten impure glass while introducing air into the melting and molten mass, then cooling the glass, then grinding the cooled glass to substantial powder-like fineness, then subjecting the ground glass to amalgamation for recovery of the precious metals therefrom, and thereafter melting the residue together with carbon.

8. The method of treating metal bearing earth that contains not less than about 15% iron, by weight, for separating the precious metals therein from the impurities comprising producing a dirty, metallic glass compound by melting the earth together with siliceous material and an oxidizing agent comprising a member of one of the group consisting of an oxidizing compound containing a halogen, and thereafter cooling the molten glass and then grinding the glass to substantially powder fineness.

ERNEST HEY.
FRANKLIN H. HUNSICKER.